United States Patent [19]

McDowell

[11] 4,284,693
[45] Aug. 18, 1981

[54] ORIENTING AND SIZING BATTERY GRIDS AND ARTICLES FORMED THEREBY

[75] Inventor: Jerry T. McDowell, Greeneville, Tenn.

[73] Assignee: Ball Corporation, Muncie, Ind.

[21] Appl. No.: 134,831

[22] Filed: Mar. 28, 1980

Related U.S. Application Data

[62] Division of Ser. No. 949,934, Oct. 10, 1978, Pat. No. 4,220,030.

[51] Int. Cl.³ .............................................. H01M 4/74
[52] U.S. Cl. .......................................... 429/211; 29/2; 429/242
[58] Field of Search ...................... 429/211, 242, 241; 29/2

[56] References Cited

U.S. PATENT DOCUMENTS

| | | | |
|---|---|---|---|
| 1,982,485 | 11/1934 | Salmon et al. | 429/242 |
| 3,310,438 | 3/1967 | Huffman et al. | 429/211 |
| 3,881,952 | 5/1975 | Wheadon et al. | 429/242 |
| 3,891,459 | 6/1975 | McCartney et al. | 429/242 |
| 3,945,097 | 3/1976 | Daniels et al. | 429/242 |

Primary Examiner—Donald L. Walton
Attorney, Agent, or Firm—Gilbert E. Alberding

[57] ABSTRACT

The subject invention is related to a battery grid formed from stock material having an open network and an unopen portion thereon wherein the unopen portion lies centrally thereon and the open network portions are of greater thickness than the unopen portion, said open network portions being provided with nodes, said grid being formed by continuously advancing the stock material along a predetermined path, forming spaced apart cut out portions on said unopen portion and simultaneously working the open network portions to orient and size the same whereby the faces of the nodes are displaced. The instant invention also relates to the battery grid so formed, the grid itself comprising a metal grid structure defining a header and a lug connecting section thereon, an open network structure depending from the header over the entire length thereof, said open network being provided with nodes having elements projecting therefrom to define cells, said nodes having a trapezoidal cross section.

8 Claims, 6 Drawing Figures

ORIENTING AND SIZING BATTERY GRIDS AND ARTICLES FORMED THEREBY

This is a division of application Ser. No. 949,934 filed October 10, 1978, now U.S. Pat. No. 4,220,030.

BACKGROUND OF THE INVENTION

The present invention relates to a method and article of manufacture and apparatus for sizing and orienting a battery grid structure and finds adaptation in the battery grid industry and, in particular, relates to the formation of individual grid bodies to render them of a consistent and uniform dimension.

The subject invention specifically is addressed to methods and an apparatus for sizing and orienting grid structures having open networks thereon whereby the structures are oriented and dimensioned to a predetermined size. Such grid structures are generally made by expanding a metal sheet to form an open network structure and thereafter applying paste thereto by means readily available in the art.

The step of expansion in the process to form the expanded structure may be readily made by conventional processes, such as disclosed in U.S. Pat. No. 3,891,459. After expansion, the expanded structure is subjected to a sizing and orienting process wherein the structure is formed to a predetermined size. This process and apparatus for carrying out the same will be described in more detail hereinafter. After this step the expanded structure is pasted and the pasting is accomplished by moving the structure into a zone where an active material, generally a thick, lead-containing paste, is applied to the open network. Various means may be used to apply the active material to the expanded structure. In order to deliver a uniform charge for distribution upon and into the open network of the grid without materially deforming the same, pasting machines are utilized and are generally of the so-called Lund or fixed orifice type or the Winkel or belt type. In the Lund type, a strip of battery paste is fed between a pair of rollers rotating to apply pressure to the grid, the paste being thereby forced into the grid structure. In the Winkel belt type, the grids are fed horizontally on a belt under a roller where the battery paste is applied. Pasting machines have also been developed that use altrasonic energy to convert battery pastes from their normally nonflowable form to a flowable form. After the expanded structure is subjected to the direct and continuous charge of paste, the pasted grid is moved into a wiping or leveling zone where a doctor blade or the nip of a set of spaced apart rollers produce a uniform paste distribution. In this fashion the paste is compressed by mechanical forces into the interstices of the network, the leveling being such as to merely allow the grid structure itself to freely pass through the zone and undergo only minimum, if any, deformation. Thereafter, the pasted grid is subjected to a drying operation to thereby affix the paste to the network. In a commercial operation, the production of grids is generally made from a large length of sheet material so that there are a multiplicity of grid structures thereon comprising expanded and unexpanded portions. After drying, the structures must be subjected to a separation or cutting operation to sectionalize and set free the individual grids for further processing. Since such structures are more or less in a delicate state, any slitting or cutting must be carefully done so as not to cause loss of paste from the pasted network. It will be appreciated that the battery grids are easily deformable and may lose their character if adequate means are not employed to handle them. Any undue treatment would cause disruption or loss of paste and, therefore, rejection of the grid structure.

In U.S. Pat. No. 1,982,485 to Salmon, et al., a battery grid is described having an expanded portion.

In U.S. Pat. No. 3,310,438 to Huffman, et al., a dispersion strengthened lead battery grid structure is disclosed. The structure is formed from expanded lead stock.

In U.S. Pat. No. 3,686,916 to Smith, et al., a special roll is described for use in the manufacture of battery plate grids.

In U.S. Pat. Nos. 3,881,952, to Wheadon, et al., and 3,891,459, to McCartney, Jr., et al., expanded grid structures are disclosed having nodes that have been flattened by rolling techniques to form certain polygonal configurations.

In U.S. Pat. No. 3,947,936 to Wheadon, expanded metal is disclosed that has been coined to enhance the characteristics thereof.

In U.S. Pat. No. 4,016,633, a method is disclosed for making a battery grid via casting that is subsequently flattened by a pressing process.

Briefly, in accordance with this invention, a battery grid formed from stock material is described and claimed, the grid having expanded and unexpanded portions thereon wherein the unexpanded portions lie centrally thereon and the expanded portions are of greater thickness than the unexpanded portions, said expanded portions being provided with nodes, said method comprising continuously advancing the stock material along a predetermined path, forming spaced apart cut out portions on said stock material and simultaneously working the expanded portions to orient and size the same whereby the faces of the nodes are displaced so that the planes of opposed faces thereof are unparallel to each other. The subject invention also relates to the article of manufacture produced by the method herein described, the article comprising a metal grid structure defining a header and a lug connection portion thereon, an open network depending from the header over the entire length thereof, said open network being provided with nodes having elements projecting therefrom to define cells, said nodes having trapezoidal configurations when viewed in cross section.

The aforementioned features with the objects and advantages which become subsequently apparent reside in the details of construction and operation as more fully hereinafter described and claimed, referenced being had to the accompanying drawings forming a part hereof, wherein like numerals refer to like parts throughout.

BRIEF DESCRIPTION OF THE DRAWINGS

An example of the invention is illustrated in the accompanying drawings in which.

SUMMARY OF THE INVENTION

It has been found in accordance with this invention that a rather unique yet simplistic design and construction afford a highly useful means for sizing and orienting a sheet or web material of grid structures having open networks with an attendant feature of sizing and strengthening the same.

It is accordingly an object of the present invention to provide a sizing device having a few functional parts and of unitary and economic construction.

It is another principal object of the invention to provide a device of the character herewithin described which has means for sizing a continuous strip of expanded material for use in conventional battery manufacturing operations.

It is still another object of this invention to provide means for a commercial, lead-base battery facility, the means providing proper sizing and orientation of individual battery grid structures.

These and other objects of the invention will become more readily apparent from a review of the specification, claims and a study of the attached drawings.

DETAILED DESCRIPTION OF THE INVENTION

Figure 6:
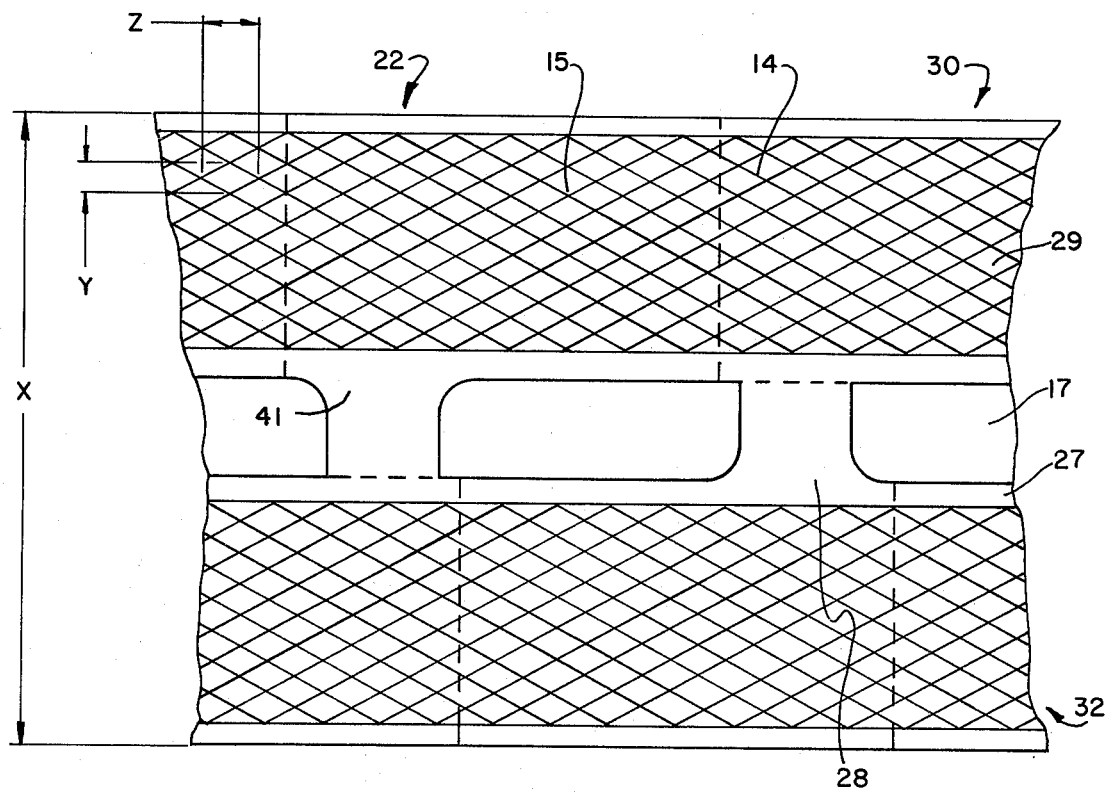
FIG. 6 is a plan view of unsectionalized grid structures.

Referring now more particularly to the accompanying drawings, 10 indicates generally a conventional battery grid line along with the essential features of the instant invention. The grids are made initially from an unexpanded metal strip 11 of metal, such as lead or lead-base alloys, drawn from a pay off roll 12 and is conveyed to a conventional expanding machine 13 in which the strip 11 is expanded to form a grid structure 22 by reciprocating slitting and expanding cutters (not shown), the strip itself being advanced step by step lengthwise into the machine. Generally, the expanding machine 13 has its cutter situated to converge on the center of the strip in the direction the strip is advanced. These results from such an expansion operation the grid structure 22 having an open network 32 comprising a plurality of skeletal, wire-like elements 14 (FIG. 6) connected one to the other by nodes 15, each node 15 and elements 14 extending diagonally through the grid structure in a more or less honeycomb or diamond-like fashion. In general, it has been found that a cell or void 29, as shown in FIG. 6, should have a ratio of the Y axis to the Z axis of less than 1 and preferably about 0.4 to 0.8 and more preferably between about 0.5 to 0.7.

Following expansion, the expanded strip 22 is laid down into substantially the same plane as the original unexpanded strip 11 from which it was formed by advancing the strip 22 through leveling rollers 18 located near the exit end of the expanding machine 13.

After leveling of the expanded strip, the strip is fed by spaced apart drive means 16 into a scrap removal and sizing machine 23. In this operation a cut out section 17 is formed and the piece so cut out is removed from the strip, this being readily accomplished by a punch and die arrangement 40. At the same time the expanded strip 22 is subjected to this cut out operation, the open network is subjected to a sizing process so that the structure is formed to a predetermined grid thickness, the elements being worked so that the structure is formed to a desired angular moment. Moreover, the sizing apparatus is so designed that during the working operation, the strip is confined to a specified dimension indicated as x in FIG. 2 and, therefore, the grid strip is perfectly sized to a predetermined width.

After removal of the scrap portion with concurrent sizing or working thereof, the grid strip is conveyed to the next operation and is there ready for pasting via pasting machine 39. The pasting machine may employ flush pasting or belt pasting using conventional pasting techniques as is well-known in the art. The pasted grid structure is thereafter cured or dried by a conventional drying oven 19. The dried grid structure is then advanced to the plate separator 21 device where the structures are sectionalized one from the other.

Figure 1:
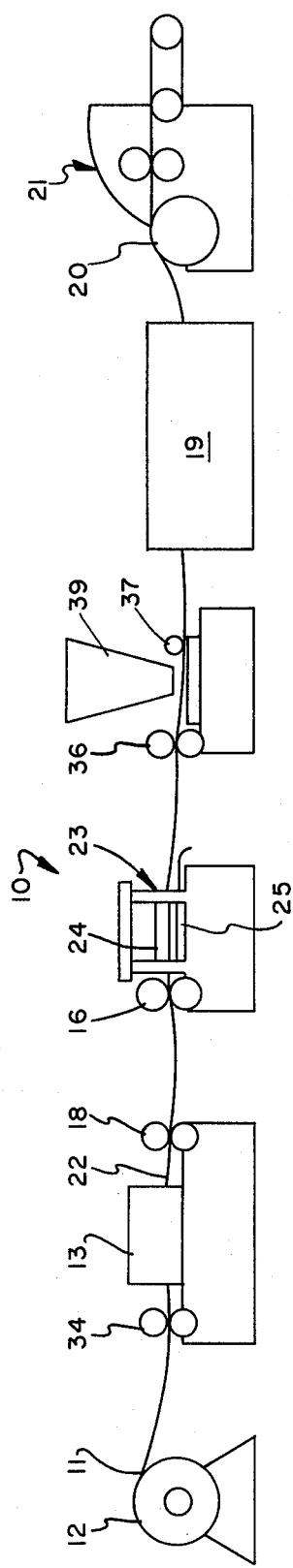
FIG. 1 is a schematic flow diagram.
Figure 2:
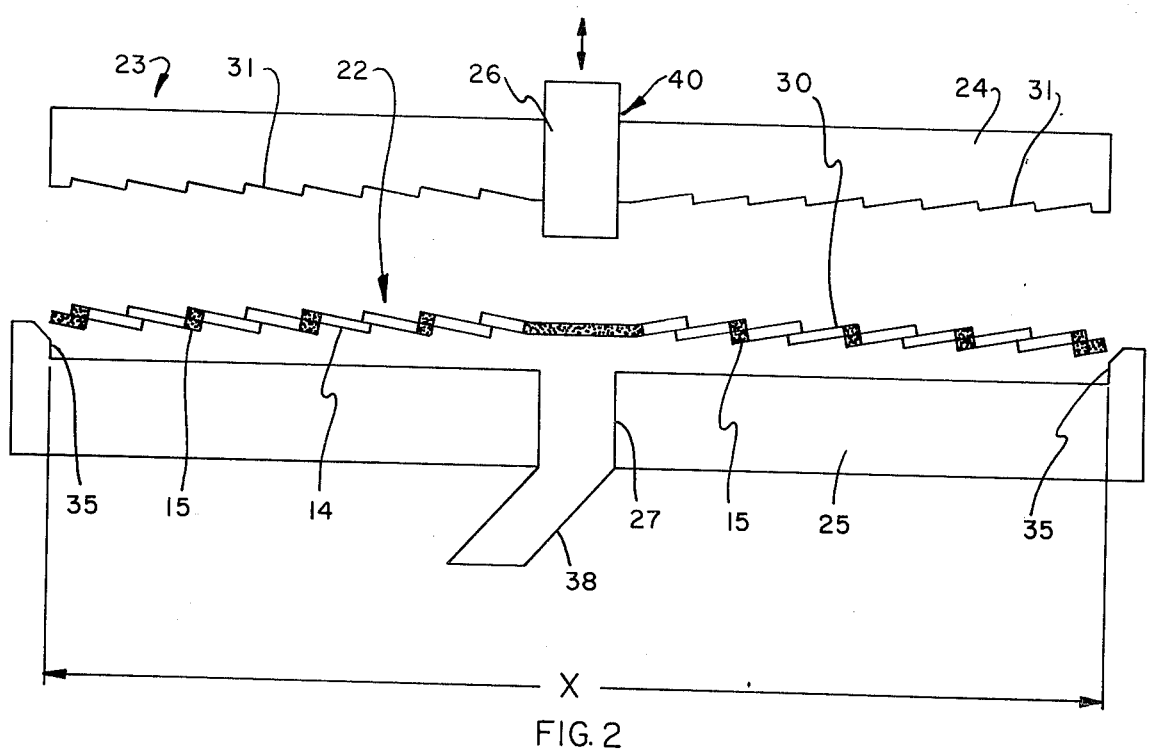
FIG. 2 is a front elevational view of the subject devices.
Figure 3:
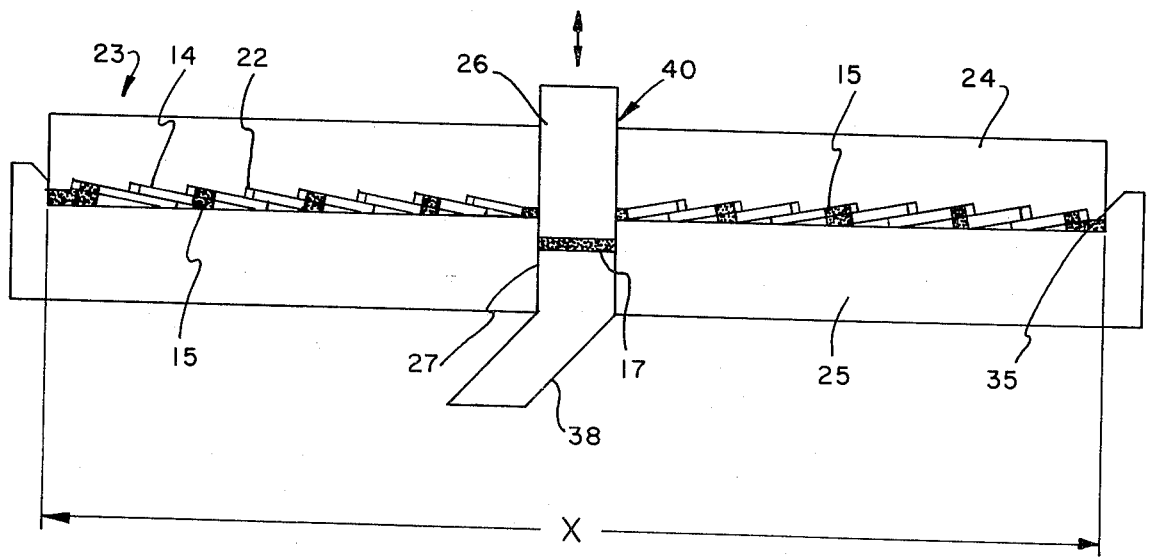
FIG. 3 is a front elevational view of the subject invention showing the apparatus in a closed or pressed position.

Referring to FIGS. 2 and 3, the sizing and orienting apparatus 40 is shown comprising an upper plate 24 that is adapted to reciprocate within a housing (not shown) so that an upper plate 24 comes into contact with a lower plate 25. Of course, a wide range of means may be used to reciprocate the plate or plates, such means being well-known to those skilled in the art. It can be seen that the upper plate 24 is provided with a punch 26 which is set above a complementary die 27 into which the punch passes in order to cut out an opening within the unexpanded central portion of a stock material. The cut out portion 17 set free passes down a chute 38. An array of inclined planes 31 is connected to the lower part of the upper plate 24 and is arranged to come into engagement with a grid structure 30. Thus, expanded strip 22 to be sized and oriented is pressed between an array of inclined planes 31 and the lower plate 25. In FIG. 3 the closed form of the sizing and orienting apparatus 23 is depicted with the grid structure 30 showing its nodes 15 being oriented. In effect, the faces 33 are brought into contact with the inclined planes 31 when the plate 24 is brought downwardly and the faces 33 of the nodes 15 are brought into contact with the flat portion of lower plate 25. In this fashion, the expanded strip 22 is oriented so that the opposite faces 33 of the nodes 15 are worked to a predetermined angle. The grid structures are formed to a uniform size by the inclined planes 31 and the walls 35 of the lower plate 25, length X in FIG. 2. By the process and apparatus of this invention, a plurality of grid structures 30 that are to be further pasted and sectionalized may be worked and sized all at the same time in a most economic manner.

In operation, after the expanded strip 22 has been formed, it is advanced to the orienting and sizing apparatus 23 which comprises a reciprocating upper plate 24 having a plurality of inclined planes 31 thereon along with a centrally located punch 26. The inclined planes 31 are so disposed outwardly of the plate and engage the nodes 15 of the grid network. Thus, as the expanded strip 22 is momentarily halted in its advance over the lower plate 25, the upper plate 24 is brought downwardly and into contact therewith where the punch 26 cuts out a portion 17 that falls through a chute 38 and the inclined planes 31 provided by the upper plate work the nodes 15 to orient and size the grid structure. It can be readily appreciated that the inclined planes 31 of the upper plate 24 are so arranged that the grid structure is readily formed as determined by the angle of said inclined planes 31 and the distance between the walls 35 of the apparatus.

Figure 4:
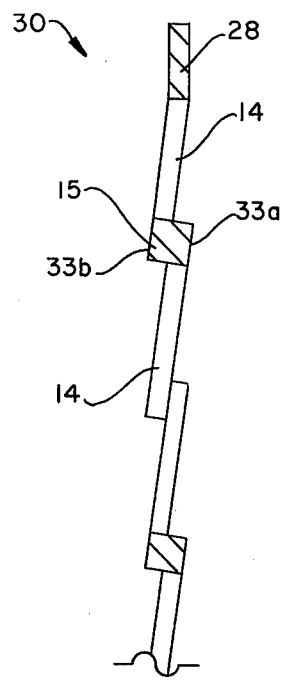
FIG. 4 is a cross sectional view of a grid structure.
Figure 5:
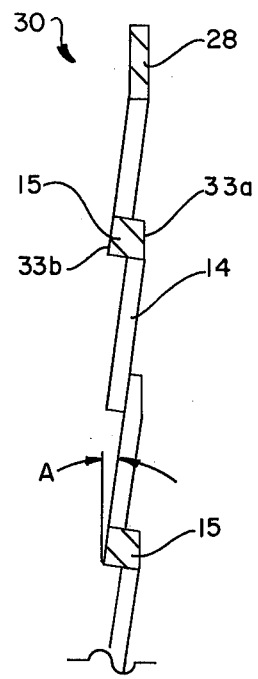
FIG. 5 is a cross sectional view of the grid structure in accordance with the instant invention.

The preferred form of grid structure made in accordance with this invention is an individual structure 30 formed from an expanded metal strip 22, generally a lead-base alloy, and provided with a header 28 and a lug portion 41 of an unexpanded metal strip and an open network portion 32 of expanded metal 22, the open network 32 being defined by wire-like elements 14 which have been pasted and sectionalized as aforementioned. FIG. 4 depicts a portion of the expanded strip 22 as it comes from the expander 13 and prior to being sized and oriented by the subject invention. The nodes 15 are more or less rectangular or rhomboid-like in cross section having their faces 33a and 33b so formed that they are substantially parallel. FIG. 5 depicts the same portion of the grid structure after being subjected to the method in accordance with the instant invention. It can be seen that one face 33a is substantially parallel to the header and the other face 33b is inclined to said header by a predetermined angle A. There are advantages to the concurrent cutting out and sizing or working of the nodal portions of the grid structures. It has been found that by the concurrent punching out of the cut out portion 17 the sheet material or strip 22 is retained or held fast from any horizontal movement or displacement so that the sizing becomes most effective in pressing downwardly with the array of inclined planes 31 that urged the nodes 15 of the expanded strip 22 slightly outwardly to the full extent as dictated by vertical walls 35 to thereby properly size the grid structure. Thus, the grid structure is firmly anchored as the array of inclined planes work the nodal portions. This offers a most uniform grid structure.

It is believed that a careful consideration of the specification in conjunction with the means of the drawings will enable the reader to obtain a clear and comprehensive understanding of the subject matter of the invention, the features and advantages, mode of use and improved result which is assured the user.

The foregoing is considered as illustrative only of the principles of the invention. Further, since a number of modifications and changes will readily occur to those skilled in the art, it is not desired to limit the invention to exact construction shown and described, and accordingly all suitable modifications and equivalents may be resorted to, falling within the scope of the invention as claimed.

What is claimed is:

1. A battery grid comprising a metal grid structure defining a header and a lug connecting portion thereon, an open network depending from the header over the entire length thereof, said open network being provided with nodes having elements projecting therefrom to define cells, said nodes having a right trapezoid cross section.

2. A battery grid as recited in claim 1 wherein the cells have a minor to major axis ratio of between about 0.2 and 0.9.

3. A battery grid as recited in claim 1 wherein the cells have a minor to major axis ratio of between about 0.5 and 0.7.

4. A battery grid as recited in claim 1 wherein the metal is a lead-base alloy.

5. A battery grid comprising a metal grid structure defining a header and a lug connecting portion thereon, an open network depending from the header over the entire length thereof, said open network being provided with nodes having elements projecting therefrom to define cells, said nodes having a trapezoid cross section.

6. A battery grid as recited in claim 5 wherein the cells have a minor to major axis ratio of between about 0.2 and 0.9.

7. A battery grid as recited in claim 5 wherein the cells have a minor to major axis ratio of between about 0.5 and 0.7.

8. A battery grid as recited in claim 5 wherein the metal is a lead-base alloy.

* * * * *